US012779427B2

(12) United States Patent
Matsukura et al.

(10) Patent No.: US 12,779,427 B2
(45) Date of Patent: Nov. 3, 2026

(54) RADIOACTIVE IODINE ADSORBENT, METHOD FOR PRODUCING RADIOACTIVE IODINE ADSORBENT, AND METHOD FOR PROCESSING RADIOACTIVE IODINE

(71) Applicants: UNION SHOWA K.K., Tokyo (JP); HITACHI GE VERNOVA NUCLEAR ENERGY, LTD., Hitachi (JP)

(72) Inventors: Minoru Matsukura, Tokyo (JP); Fumio Kurosaki, Tokyo (JP); Tomoya Kitagawa, Tokyo (JP); Junji Iwasa, Hitachinaka (JP); Naoki Kanno, Hitachi (JP); Yoshinori Kobayashi, Hitachinaka (JP)

(73) Assignees: UNION SHOWA K.K., Tokyo (JP); GE VERNOVA NUCLEAR ENERGY, LTD., Hitachi (JP)

(*) Notice: Subject to any disclaimer, the term of this patent is extended or adjusted under 35 U.S.C. 154(b) by 483 days.

(21) Appl. No.: 18/286,842

(22) PCT Filed: Apr. 12, 2022

(86) PCT No.: PCT/JP2022/017547
§ 371 (c)(1),
(2) Date: Oct. 13, 2023

(87) PCT Pub. No.: WO2022/220226
PCT Pub. Date: Oct. 20, 2022

(65) Prior Publication Data

US 2024/0189794 A1 Jun. 13, 2024

(30) Foreign Application Priority Data

Apr. 16, 2021 (JP) ................................ 2021-069835

(51) Int. Cl.
*B01J 20/18* (2006.01)
*B01J 20/02* (2006.01)
(Continued)

(52) U.S. Cl.
CPC ........... *B01J 20/18* (2013.01); *B01J 20/0233* (2013.01); *B01J 20/3078* (2013.01); *B01J 20/3204* (2013.01); *B01J 2220/42* (2013.01)

(58) Field of Classification Search
CPC ...... B01J 20/0233; B01J 20/18; B01J 20/186; B01J 20/3078; B01J 20/3204;
(Continued)

(56) References Cited

U.S. PATENT DOCUMENTS 4,735,786 A 4/1988 Inoue et al.
5,352,367 A 10/1994 Ochiai et al.
(Continued)

FOREIGN PATENT DOCUMENTS

CN 101829542 A 9/2010
CN 112742346 A * 5/2021 .............. C02F 1/281
(Continued)

OTHER PUBLICATIONS

Machine translation of Yang et al (CN112742346). (Year: 2022).*
(Continued)

*Primary Examiner* — Brian A McCaig
(74) *Attorney, Agent, or Firm* — Sughrue Mion, PLLC

(57) ABSTRACT

A radioactive iodine adsorbent is obtained by supporting silver on a high-silica zeolite in which a hydroxyl nest present inside the high-silica zeolite is converted into a Si—O—Si bond, and the high-silica zeolite is at least any selected from the group consisting of a chabazite (CHA)-type zeolite, a mordenite (MOR)-type zeolite, and a clinoptilolite (CLP)-type zeolite.

3 Claims, 4 Drawing Sheets

(51) Int. Cl.
*B01J 20/30* (2006.01)
*B01J 20/32* (2006.01)

(58) Field of Classification Search
CPC ..... B01J 20/3236; B01J 2220/42; G21F 9/02; G21F 9/12
See application file for complete search history.

(56) References Cited

U.S. PATENT DOCUMENTS

| | | | | |
|---|---|---|---|---|
| 5,962,735 | A | 10/1999 | Kulprathipanja et al. | |
| 8,262,950 | B1 | 9/2012 | Nenoff et al. | |
| 2010/0121098 | A1 * | 5/2010 | Ditzel | B01J 29/20 560/232 |

FOREIGN PATENT DOCUMENTS

| | | | |
|---|---|---|---|
| JP | 60-225638 | A | 11/1985 |
| JP | 5-126995 | A | 5/1993 |
| JP | 2000-334206 | A | 12/2000 |
| JP | 2013-104727 | A | 5/2013 |
| JP | 2016-107213 | A | 6/2016 |
| JP | 2018-91732 | A | 6/2018 |
| JP | 2019-113484 | A | 7/2019 |

OTHER PUBLICATIONS

Christian W. Lopes et al., "Zeolite-driven *Ag* species during redox treatments and catalytic implications for SCO of NH 3", Journal of Materials Chemistry A, 2021, vol. 9, No. 48, pp. 27448-27458.
Meryem Sakizci et al., "The characterization and methane adsorption of Ag-, Cu-, Fe-, and H-exchanged chabazite-rich tuff from Turkey", Environmental Science and Pollution Research, 2019, vol. 26, No. 16, pp. 16616-16627.
M Chebbi et al., "Influence of structural, textural and chemical parameters of silver zeolites on the retention of methyl iodide", Microporous and Mesoporous Materials, 2017. vol. 244, pp. 137-150.
Bruno Azambre et al., "Effects of the cation and Si/Al ratio on CH3I adsorption by faujasite zeolites", Chemical Engineering Journal, 2020, vol. 379 (10 pages).
H Jabraoui et al., "Adsorption of volatile organic and iodine compounds over silver-exchanged mordenites: A comparative periodic DFT study for several silver loadings", Applied Surface Science, 2019, vol. 485, ppl 56-63.
Joffrey Huve et al., "Porous sorbents for the capture of radioactive iodine compounds: a review", RSC Advances, 2018, vol. 8, No. 51, pp. 22948-22973.
Extended European Search Report dated Sep. 26, 2025, issued in European application No. 22788151.3.
International Search Report dated May 24, 2022 in International Application No. PCT/JP2022/017547.
Written Opinion dated May 24, 2022 in International Application No. PCT/JP2022/017547.

* cited by examiner

[Fig. 1]
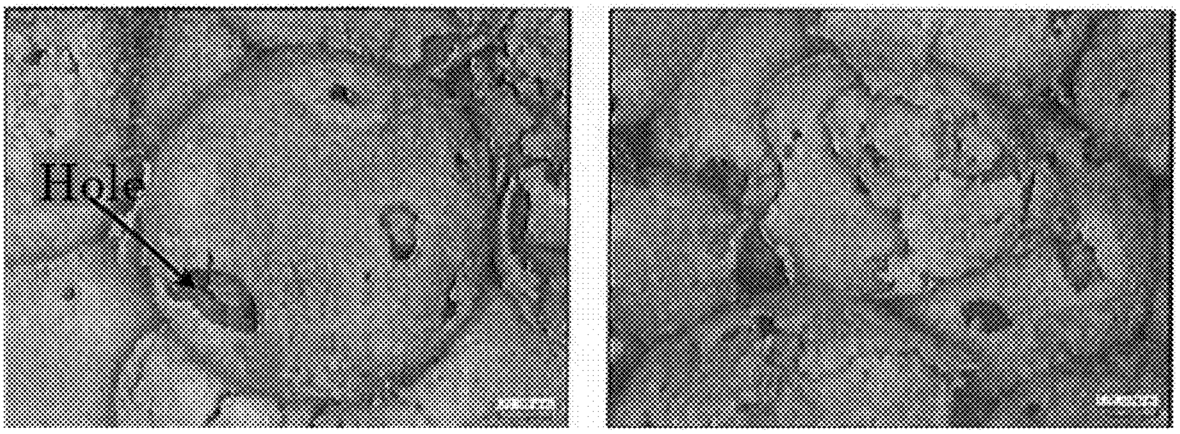

[Fig. 2]
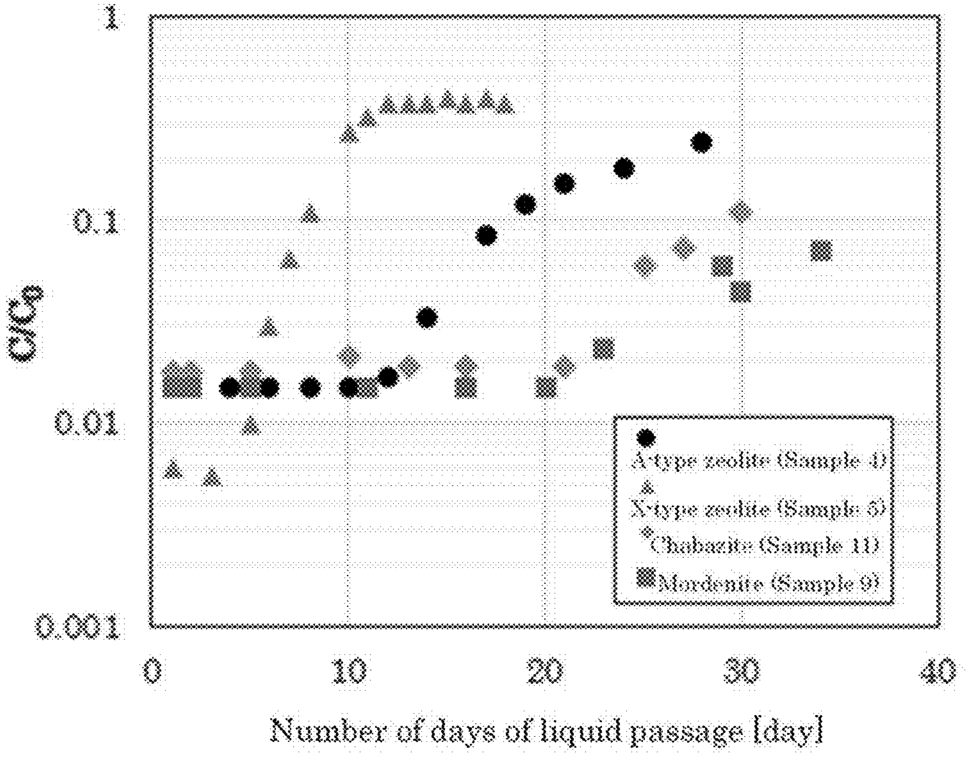

[Fig. 3]
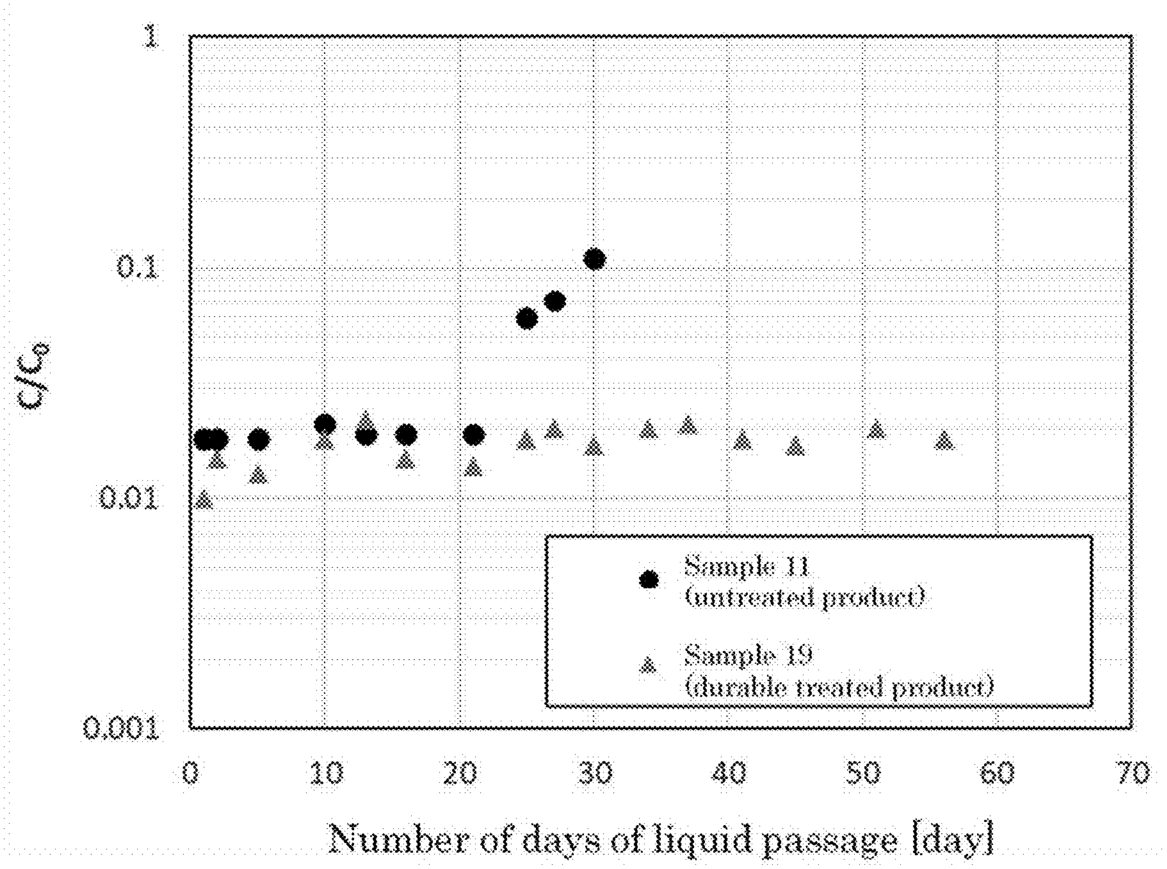

[Fig. 4]
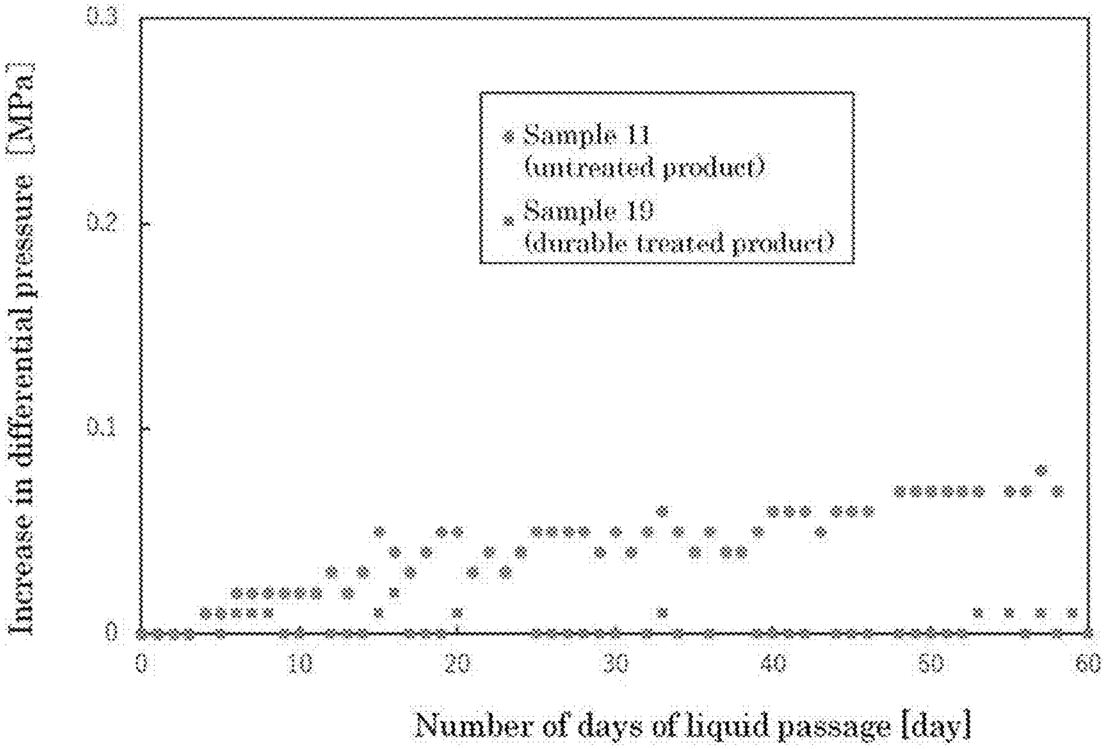

RADIOACTIVE IODINE ADSORBENT, METHOD FOR PRODUCING RADIOACTIVE IODINE ADSORBENT, AND METHOD FOR PROCESSING RADIOACTIVE IODINE

CROSS REFERENCE TO RELATED APPLICATIONS

This application is a National Stage of International Application No. PCT/JP2022/017547 filed Apr. 12, 2022, claiming priority based on Japanese Patent Application No. 2021-069835 filed Apr. 16, 2021.

TECHNICAL FIELD

The present invention relates to a radioactive iodine adsorbent suitable for use under an acidic condition. Specifically, the present invention relates to a radioactive iodine adsorbent suitable for application in which radioactive iodine is adsorbed and removed from a waste liquid that has been drained from a nuclear facility and to which a reductant is added to convert the waste liquid into an acidic solution, a method for producing the radioactive iodine adsorbent, and a method for processing radioactive iodine.

BACKGROUND ART

A waste liquid generated in nuclear-related facilities (hereinafter referred to as nuclear facilities) such as a nuclear power plant contains various radioactive substances, and the radioactive substances need to be removed prior to drain. Among the radioactive substances, radioactive iodine, iodine-129, which is one of isotopes, has a long half-life of approximately 15.7 million years, and tends to be accumulated in the human body, selectively in the thyroid gland and the like. Therefore, it is necessary to completely remove the radioactive substances from the waste liquid.

The chemical species of radioactive iodine contained in the waste liquid drained from the nuclear facilities are mainly two types: iodine ion ($I^-$) and iodate ions ($IO_3^-$).

As an adsorbent for iodine ions (hereinafter referred to as iodine ion adsorbent), activated carbon-supported silver in which silver is supported on activated carbon and silver-zeolite in which silver is supported on an A-type zeolite or an X-type zeolite are known. However, these adsorbents cannot remove iodate ions present in the waste liquid.

On the other hand, cerium oxide is known as an adsorbent for iodate ions (hereinafter referred to as iodate ion adsorbent). However, cerium oxide has a low adsorption capacity and cannot remove iodine ions present in the waste liquid.

As a procedure for collectively removing iodine ion and iodate ions, a processing method in which a reductant is added to an aqueous solution containing iodine ion and iodate ions to reduce iodate ions to iodine ion, and silver nitrate is further added to precipitate the iodine ion as silver iodide has been proposed (PTL 1). However, the procedure of PTL 1 has a problem on a waste treatment that sludge containing a radioactive substance as a precipitate is generated.

When activated carbon-supported silver, which has been generally used as an iodine ion adsorbent, or silver-zeolite in which silver is supported on an A-type zeolite or an X-type zeolite is used instead of the silver nitrate, the generation of the sludge containing a radioactive substance can be avoided. However, there are a problem that the iodine ion adsorbent has a decreased ability to adsorb iodine ion in the coexistence of the reductant, a problem that the iodine ion adsorbent is likely to be brittle under an acidic condition where the reductant coexists to generate clogging during liquid passage through an adsorption tower such as a column, and the like.

PTL 2 discloses as an iodine ion adsorbent silver-zeolite particles in which silver is supported on a zeolite and that are to be reduced using a reductant. PTL 2 describes that even when polyvalent cationic atoms or cationic atoms of larger atomic number than silver ions are present in an aqueous solution containing a substance to be adsorbed, the iodine ion adsorbent can avoid elution of silver due to further exchange of ions thereof with silver ions.

Even when the iodine ion adsorbent described in PTL 2 is used instead of the silver nitrate, there are a problem that the iodine ion adsorbent is likely to be brittle under an acidic condition where the reductant coexists to generate clogging during liquid passage through an adsorption tower such as a column, and the like.

Accordingly, a method in which for removal of radioactive iodine contained in the waste liquid drained from the nuclear facilities, iodate ions are reduced to iodine ions by the reductant and the iodine ions are collectively removed cannot be usually adopted. It is necessary to use both the iodine ion adsorbent and the iodate ion adsorbent.

CITATION LIST

Patent Literature

PTL 1: JP 5-126995 A
PTL 2: JP 2016-107213 A

SUMMARY OF INVENTION

Technical Problem

The present invention has been made in view of such a technological background, and it is an object of the present invention is to provide a radioactive iodine adsorbent that is suitable for application in which iodate ions are reduced to iodine ions by addition of a reductant to a solution containing radioactive iodine and the iodine ions are collectively removed, has a high adsorption ability for iodine ions without decreasing the adsorption ability even under an acidic condition where the reductant coexists in the solution, and is unlikely to be brittle, a method for producing the radioactive iodine adsorbent, and a method for processing radioactive iodine.

Solution to Problem

In order to achieve the object, the present invention provides the following means.

<Radioactive Iodine Adsorbent>

[1] A radioactive iodine adsorbent obtained by supporting silver on a high-silica zeolite in which a hydroxyl nest present inside the high-silica zeolite is converted into a Si—O—Si bond, wherein the high-silica zeolite is at least any selected from the group consisting of a chabazite (CHA)-type zeolite, a mordenite (MOR)-type zeolite, and a clinoptilolite (CLP)-type zeolite.

[2] The radioactive iodine adsorbent according to [1], wherein a $SiO_2/Al_2O_3$molar ratio of the high-silica zeolite is 2 to 100.

[3] The radioactive iodine adsorbent according to [1] or [2], wherein an amount of the supported silver is 1 to 15 mass %.

<Method For Producing Radioactive Iodine Adsorbent>

[4] A method for producing a radioactive iodine adsorbent obtained by supporting silver on a high-silica zeolite in which a hydroxyl nest present inside the high-silica zeolite is converted into a Si—O—Si bond, wherein the high-silica zeolite is at least any selected from the group consisting of a chabazite (CHA)-type zeolite, a mordenite (MOR)-type zeolite, and a clinoptilolite (CLP)-type zeolite.

[5] The method for producing a radioactive iodine adsorbent according to [4], wherein the hydroxyl nest is converted into the Si—O—Si bond by a heat treatment at 500 to 700° C.

[6] The method for producing a radioactive iodine adsorbent according to [4] or [5], wherein a $SiO_2/Al_2O_3$ molar ratio of the high-silica zeolite is 2 to 100.

[7] The method for producing a radioactive iodine adsorbent according to any of [4] to [6], wherein an amount of the supported silver is 1 to 15 mass %.

<Method for Processing Radioactive Iodine>

[8] A method for processing radioactive iodine including a step of adding a reductant to a waste liquid drained from a nuclear facility to convert the waste liquid into an acidic solution, and a step of passing the acidic solution through the radioactive iodine adsorbent according to any of [1] to [3].

Advantageous Effects of Invention

The present invention can provide a radioactive iodine adsorbent that has a high adsorption ability for iodine ions without decreasing the adsorption ability even under an acidic condition where a reductant coexists in a solution containing iodine ions as a substance to be adsorbed, and is unlikely to be brittle. The present invention can provide a method for producing the radioactive iodine adsorbent and a method for processing radioactive iodine using the radioactive iodine adsorbent.

BRIEF DESCRIPTION OF DRAWINGS

FIG. 1 is photographs showing results of evaluation of fragility of Sample 3.

FIG. 2 is a graph showing results of evaluation of iodine adsorption properties using Samples 4, 5, 9, and 11.

FIG. 3 is a graph showing results of evaluation of iodine adsorption properties using Samples 11 and 19.

FIG. 4 is a graph showing results of differential pressure evaluation using Samples 11 and 19.

DESCRIPTION OF EMBODIMENTS

Hereinafter, the present invention will be described in detail based on embodiments thereof. In the following description, a numerical range of "A to B" represents a numerical range including A and B that are endpoints. "Parts by mass" and "mass %" have the same definition as "parts by weight" and "wt %", respectively.

<Radioactive Iodine Adsorbent and Method for Producing Radioactive Iodine Adsorbent>

A radioactive iodine adsorbent of the present invention is obtained by supporting silver on a high-silica zeolite in which a hydroxyl nest present inside the high-silica zeolite is converted into a Si—O—Si bond. The high-silica zeolite is at least any selected from the group consisting of a chabazite (CHA)-type zeolite, a mordenite (MOR)-type zeolite, and a clinoptilolite (CLP)-type zeolite.

In the present invention, the high-silica zeolite means a zeolite having a $SiO_2/Al_2O_3$ molar ratio of more than 2.0.

In a crystal lattice of a zeolite having a $SiO_2/Al_2O_3$ molar ratio of 2.0, Si and Al are alternately arranged, and Al is disposed between Si and Si. In a crystal lattice of a zeolite having a $SiO_2/Al_2O_3$ molar ratio of more than 2.0, a portion where Al is not disposed between Si and Si (hereinafter referred to as hydroxyl nest) is present. The hydroxyl nest is a lattice defect, and decreases the durability of the high-silica zeolite.

The inventors of the present invention have intensively studied, and as a result, found that by a heat treatment of a high-silica zeolite including a hydroxyl nest in the inside, the hydroxyl nest can be converted into a Si—O—Si bond to enhance the durability, and a radioactive iodine adsorbent obtained by supporting silver after the hydroxyl nest is converted into a Si—O—Si bond by the heat treatment has a high adsorption ability for iodine ions without decreasing the adsorption ability under an acidic condition where a reductant coexists in a solution containing iodine ions as a substance to be adsorbed, and is unlikely to be brittle. Thus, the present invention has been completed.

The heat treatment is preferably a heat treatment at 500 to 700° C. for 20 to 90 minutes, more preferably a heat treatment at 550 to 650° ° C. for 20 to 60 minutes, and further preferably a heat treatment at 600 to 650° C. for 30 to 50 minutes.

The $SiO_2/Al_2O_3$ molar ratio of the high-silica zeolite used as a base material for the radioactive iodine adsorbent is preferably 100 or less, more preferably 50 or less, and further preferably 20 or less. The $SiO_2/Al_2O_3$ molar ratio is preferably more than 2.0, more preferably 3.0 or more, and further preferably 4.5 or more. As the $SiO_2/Al_2O_3$ molar ratio is lower, the amount of silver that can be supported is increased to enhance the adsorption ability for iodine ions, but acid resistance is decreased, and brittleness is likely to occur under an acidic condition where a reductant coexists in an aqueous solution. When the $SiO_2/Al_2O_3$ molar ratio is within the aforementioned range, the radioactive iodine adsorbent that has a high adsorption ability for iodine ions without decreasing the adsorption ability even under the acidic condition where the reductant coexists in the solution, and is unlikely to be brittle can be obtained.

The high-silica zeolite used as a base material in the radioactive iodine adsorbent of the present invention is not limited to a synthesized product, and may be a natural product.

The amount of silver supported on the high-silica zeolite in the radioactive iodine adsorbent of the present invention (hereinafter also referred to as amount of supported) is preferably 1 to 15 mass %, and more preferably 3 to 12 mass %, relative to the total amount of the radioactive iodine adsorbent. As the amount of supported silver is larger, the adsorption ability for iodine ions can be enhanced, but silver iodide liberated is likely to be generated when the solution containing iodine ions as the substance to be adsorbed is passed, and clogging is likely to occur in an adsorption tower such as a column during liquid passage. When the amount of supported silver is within the aforementioned range, a sufficient level of adsorption ability for iodine ions can be achieved while the clogging is avoided.

The shape of the radioactive iodine adsorbent is not particularly limited, and the radioactive iodine adsorbent is preferably a granular (also referred to as bead-shaped) or columnar (also referred to as pellet-shaped) molded body. This is because the adsorption tower such as a column is filled with the radioactive iodine adsorbent for use.

The particle diameter of the radioactive iodine adsorbent is preferably 0.1 mm or more and 5.0 mm or less, and more preferably 0.2 mm or more and 2.0 mm or less. When the particle diameter of the radioactive iodine adsorbent is 0.1 mm or more, high liquid permeability can be achieved without excessively increasing resistance during filling of the adsorption tower and liquid passage. When the particle diameter of the radioactive iodine adsorbent is 5.0 mm or less, a decrease in adsorption rate due to an increase in the outer surface area of the radioactive iodine adsorbent with which the adsorption tower is filled can be avoided, and a sufficient level of adsorption ability for iodine ions can be achieved.

<Method for Processing Radioactive Iodine>

The radioactive iodine adsorbent of the present invention can be suitably used in adsorption and removal of iodine ion and iodate ions that are radioactive iodine contained in a waste liquid drained from a nuclear facility.

A method for processing radioactive iodine using the radioactive iodine adsorbent of the present invention includes a step of adding a reductant to a waste liquid drained from a nuclear facility to convert the waste liquid into an acidic solution (hereinafter referred to as reductant adding step), and a step of passing the waste liquid that becomes the acidic solution through the radioactive iodine adsorbent (hereinafter referred to as liquid passage step).

In the reductant adding step, iodate ions ($IO_3^-$) are reduced to iodine ions ($I^-$) by the reductant.

The reductant used in the reductant adding step is not limited as long as it can reduce iodate ions. Examples thereof include formaldehyde, acetaldehyde, sodium sulfite, sodium pyrosulfite (SMBS), and L-ascorbic acid (vitamin C). Among them, L-ascorbic acid is preferred from the viewpoint of the amount of iodine adsorbed and waste liquid treatment with harmfulness.

In the liquid passage step, iodine ions contained in the acidic solution are adsorbed and removed by the radioactive iodine adsorbent.

EXAMPLES

Preparation of Test Sample: Samples 1 to 15 (Comparative Examples) and Samples 16 to 19 (Examples)

Test samples were prepared under conditions of the following Table 1.

As a zeolite in each of the samples, each type of zeolite described in Table 1 (for example, in a case of Sample 1, "A-type zeolite powder") was molded in a bead shape.

For the sample in which Heat treatment before supporting silver was "presence", a zeolite before supporting silver was subjected to a heat treatment at 600° C. for 30 minutes. The heat treatment is discriminated from a heating treatment before each of the following measurements (heating treatment after supporting silver), and refers to "heat treatment before supporting silver" below.

A zeolite molded body was immersed in a silver nitrate aqueous solution, subjected to an ion-exchange treatment, sufficiently washed with pure water, and dried to obtain zeolite-supported silver.

The amount of supported silver was measured by an X ray fluorescence spectrometer (XRF-1700 manufactured by Shimadzu Corporation). As a pre-treatment before measurement of the amount of supported silver, all the samples (Samples 1 to 19) were subjected to a heating treatment at 550° ° C. for one hour.

TABLE 1

| | Sample No. | Zeolite | Heat treatment before supporting silver | Amount of supported silver (wt %) | Reductant |
|---|---|---|---|---|---|
| Comparative Example 1 | 1 | A-type | Absence | 25 | Absence |
| Comparative Example 2 | 2 | A-type | Absence | 0 | Presence (L-ascorbic acid) |
| Comparative Example 3 | 3 | A-type | Absence | 25 | Presence (L-ascorbic acid) |
| Comparative Example 4 | 4 | A-type | Absence | 25 | Presence (L-ascorbic acid) |
| Comparative Example 5 | 5 | X-type | Absence | 25 | Presence (L-ascorbic acid) |
| Comparative Example 6 | 6 | L-type | Absence | 3 | Presence (L-ascorbic acid) |
| Comparative Example 7 | 7 | Y-type | Absence | 10 | Presence (L-ascorbic acid) |
| Comparative Example 8 | 8 | Mordenite (natural) | Absence | 8 | Presence (L-ascorbic acid) |
| Comparative Example 9 | 9 | Mordenite (synthesized) | Absence | 8 | Presence (L-ascorbic acid) |
| Comparative Example 10 | 10 | Chabazite (natural) | Absence | 11 | Presence (L-ascorbic acid) |
| Comparative Example 11 | 11 | Chabazite (synthesized) | Absence | 11 | Presence (L-ascorbic acid) |
| Comparative Example 12 | 12 | A-type | Presence (600° C.) | 25 | Presence (L-ascorbic acid) |
| Comparative Example 13 | 13 | X-type | Presence (600° C.) | 25 | Presence (L-ascorbic acid) |
| Comparative Example 14 | 14 | L-type | Presence (600° C.) | 3 | Presence (L-ascorbic acid) |
| Comparative Example 15 | 15 | Y-type | Presence (600° C.) | 10 | Presence (L-ascorbic acid) |
| Example 1 | 16 | Mordenite (natural) | Presence (600° C.) | 8 | Presence (L-ascorbic acid) |
| Example 2 | 17 | Mordenite (synthesized) | Presence (600° C.) | 8 | Presence (L-ascorbic acid) |
| Example 3 | 18 | Chabazite (natural) | Presence (600° C.) | 11 | Presence (L-ascorbic acid) |
| Example 4 | 19 | Chabazite (synthesized) | Presence (600° C.) | 11 | Presence (L-ascorbic acid) |

<Evaluation of Fragility using Samples 1 to 3> i. Preparation of Solution

Each of potassium iodate, L-ascorbic acid, and hydrochloric acid was added to neutral artificial sea water (Marine art SF-1 available from Tomita Pharmaceutical Co., Ltd., was dissolved in ion exchanged water) at the following concentration.

Cl: 900 ppm by mass (solutions for evaluation of fragility using Samples 1 to 3)

L-ascorbic acid: 0 ppm by mass (solution for evaluation of fragility using Sample 1)

L-ascorbic acid: 5,000 ppm by mass (solutions for evaluation of fragility using Samples 2 and 3)

pH: 3 to 4 ii. Evaluation of Fragility

To 250 g of each solution prepared in i, 0.5 g of each of the samples was added. Six days after the addition, fragility was evaluated by observation of appearance of each of the samples and analysis of composition thereof.

The results of evaluation of fragility are shown in the following Table 2.

TABLE 2

| | Sample No. | Zeolite | Heat treatment before supporting silver | Amount of supported silver (wt %) | Reductant | Evaluation of fragility |
|---|---|---|---|---|---|---|
| Comparative Example 1 | 1 | A-type | Absence | 25 | Absence | No change |
| Comparative Example 2 | 2 | A-type | Absence | 0 | Presence (L-ascorbic acid) | No change |
| Comparative Example 3 | 3 | A-type | Absence | 25 | Presence (L-ascorbic acid) | Cracking and generation of hole |

Sample 1: Silver was supported on an A-type zeolite without adding L-ascorbic acid to an acidic solution. The appearance of the A-type zeolite was not changed, and brittleness was not confirmed.

Sample 2: L-ascorbic acid was added to the acidic solution, but silver was not supported on an A-type zeolite. The appearance of the A-type zeolite was not changed, and brittleness was not confirmed.

Sample 3: L-ascorbic acid was added to the acidic solution, and silver was supported on an A-type zeolite. As shown in FIG. 1, brittleness such as a hole, a crack, and powdering was confirmed in the A-type zeolite.

<Measurement of $SiO_2/Al_2O_3$ Molar Ratio and Evaluation of Fragility using Samples 4 to 11>

For the $SiO_2/Al_2O_3$ molar ratio of each of the samples, the mass proportions of Si and Al measured by an X ray fluorescence spectrometer (XRF-1700 manufactured by Shimadzu Corporation) were determined by quantitation using a standard curve, and the $SiO_2/Al_2O_3$ molar ratio was calculated. As a pre-treatment before measurement by the X ray fluorescence spectrometer (XRF-1700 manufactured by Shimadzu Corporation), all the samples (Samples 4 to 11) were subjected to a heating treatment at 575° C. for one hour.

i. Preparation of Solution

Each of potassium iodate, L-ascorbic acid, and hydrochloric acid was prepared in neutral artificial sea water (Marine art SF-1 available from Tomita Pharmaceutical Co., Ltd., was dissolved in ion exchanged water) at the following concentration.

Cl: 900 ppm by mass (solutions for evaluation of fragility using Samples 4 to 11)

L-ascorbic acid: 5,000 ppm by mass (solutions for evaluation of fragility using Samples 4 to 11)

pH: 3 to 4 ii. Evaluation of Fragility

To 250 g of each solution prepared in i, 0.5 g of each of the samples was added. Six days after the addition, fragility was evaluated by observation of appearance of each of the samples and analysis of composition thereof.

The results of measurement of the $SiO_2/Al_2O_3$ molar ratio and the results of evaluation of fragility are shown in the following Table 3.

TABLE 3

| | Sample No. | Zeolite | Heat treatment before supporting silver | Amount of supported silver (wt %) | $SiO_2/Al_2O_3$ before evaluation | $SiO_2/Al_2O_3$ after 6 days | Evaluation of fragility |
|---|---|---|---|---|---|---|---|
| Comparative Example 4 | 4 | A-type | Absence | 25 | 2.0 | 3.0 | Cracking and generation of hole |
| Comparative Example 5 | 5 | X-type | Absence | 25 | 2.5 | 4.3 | Cracking and generation of hole |
| Comparative Example 6 | 6 | L-type | Absence | 3 | 5.0 | 7.0 | Generation of hole |

TABLE 3-continued

| | Sample No. | Zeolite | Heat treatment before supporting silver | Amount of supported silver (wt %) | $SiO_2/Al_2O_3$ before evaluation | $SiO_2/Al_2O_3$ after 6 days | Evaluation of fragility |
|---|---|---|---|---|---|---|---|
| Comparative Example 7 | 7 | Y-type | Absence | 10 | 10.0 | 11.0 | Generation of hole |
| Comparative Example 8 | 8 | Mordenite (natural) | Absence | 8 | 5.2 | 6.0 | Surface powdered |
| Comparative Example 9 | 9 | Mordenite (synthesized) | Absence | 8 | 6.0 | 6.5 | Surface powdered |
| Comparative Example 10 | 10 | Chabazite (natural) | Absence | 11 | 5.0 | 5.5 | Surface powdered |
| Comparative Example 11 | 11 | Chabazite (synthesized) | Absence | 11 | 5.7 | 6.0 | Surface powdered |

For all Samples 4 to 11, the $SiO_2/Al_2O_3$ molar ratio was increased six days after the addition of the solution containing the reductant (L-ascorbic acid), and dealumination in the solution was confirmed. It was confirmed that as the $SiO_2/Al_2O_3$ molar ratio before evaluation was higher, the composition was less changed, and a high-silica zeolite had higher durability at an acidic region. In the surfaces of all the zeolite molded bodies, the same brittleness as that in FIG. 1, such as a hole, a crack, and powdering, was confirmed. As confirmed from the results of Table 3, all Samples 4 to 11 were not suitable for use in the acidic solution in which the reductant was added.

<Measurement of $SiO_2/Al_2O_3$ Molar Ratio and Evaluation of Fragility using Samples 12 to 19>

For the $SiO_2/Al_2O_3$ molar ratio of each of the samples, the mass proportions of Si and Al measured by an X ray fluorescence spectrometer (XRF-1700 manufactured by Shimadzu Corporation) were determined by quantitation using a standard curve, and the $SiO_2/Al_2O_3$ molar ratio was calculated. As a pre-treatment before measurement by the X ray fluorescence spectrometer (XRF-1700 manufactured by Shimadzu Corporation), all the samples (Samples 12 to 19) were subjected to a heating treatment at 575° C. for one hour.

i. Preparation of Solution

Each of potassium iodate, L-ascorbic acid, and hydrochloric acid was prepared in neutral artificial sea water (Marine art SF-1 available from Tomita Pharmaceutical Co., Ltd., was dissolved in ion exchanged water) at the following concentration.

Cl: 900 ppm by mass (solutions for evaluation of fragility using Samples 4 to 11)

L-ascorbic acid: 5,000 ppm by mass (solutions for evaluation of fragility using Samples 4 to 11)

pH: 3 to 4 ii. Evaluation of Fragility

To 250 g of each solution prepared in i, 0.5 g of each of the samples was added. Six days after the addition, fragility was evaluated by observation of appearance of each of the samples and analysis of composition thereof.

The results of measurement of the $SiO_2/Al_2O_3$ molar ratio and the results of evaluation of fragility are shown in the following Table 4.

TABLE 4

| | Sample No. | Zeolite | Heat treatment before supporting silver | Amount of supported silver (wt %) | $SiO_2/Al_2O_3$ before evaluation | $SiO_2/Al_2O_3$ after immersion | Evaluation of fragility |
|---|---|---|---|---|---|---|---|
| Comparative Example 12 | 12 | A-type | Presence (600° C.) | 25 | 2.0 | 3.0 | Cracking and generation of hole |
| Comparative Example 13 | 13 | X-type | Presence (600° C.) | 25 | 2.5 | 4.3 | Cracking and generation of hole |
| Comparative Example 14 | 14 | L-type | Presence (600° C.) | 3 | 5.0 | 7.0 | Generation of hole |
| Comparative Example 15 | 15 | Y-type | Presence (600° C.) | 10 | 10.0 | 10.5 | Generation of hole |
| Example 1 | 16 | Mordenite (natural) | Presence (600° C.) | 8 | 5.2 | 5.3 | No change |
| Example 2 | 17 | Mordenite (synthesized) | Presence (600° C.) | 8 | 6.0 | 6.0 | No change |
| Example 3 | 18 | Chabazite (natural) | Presence (600° C.) | 11 | 5.0 | 5.1 | No change |
| Example 4 | 19 | Chabazite (synthesized) | Presence (600° C.) | 11 | 5.7 | 5.7 | No change |

The conditions of Samples 12 to 19 and the conditions of Samples 4 to 11 are different in terms of the presence or absence of heat treatment before supporting silver (a heat treatment at 600° ° C. for 30 minutes before supporting silver). In the surfaces of the zeolite molded bodies of all Samples 4 to 11, brittleness such as a hole, a crack, and powdering was confirmed as described above. For Samples 12 to 15, the same results were confirmed. For Samples 16 to 19 using the zeolite that was "at least any selected from the group consisting of a chabazite (CHA)-type zeolite, a mordenite (MOR)-type zeolite, and a clinoptilolite (CLP)-type zeolite", the $SiO_2/Al_2O_3$ molar ratio was hardly changed, and no occurrence of dealumination in the solution was confirmed. In the surfaces of the zeolite molded bodies of all Samples 12 to 15, brittleness such as a hole, a crack, and powdering was not confirmed. As confirmed from the results of Table 4, all Samples 12 to 15 were not suitable for use in the acidic solution to which the reductant was added, and all Samples 16 to 19 were suitable for use in the acidic solution in which the reductant was added.

<Evaluation of Iodine Adsorption Properties using Samples 4, 5, 9, and 11> i. Preparation of Solution

Each of sodium iodide, L-ascorbic acid, and hydrochloric acid was prepared in artificial sea water (Marine art SF-1 available from Tomita Pharmaceutical Co., Ltd., was dissolved in ion exchanged water) at the following concentration.

Cl: 900 ppm by mass
I: 0.2 ppm by mass
L-ascorbic acid: 30 ppm by mass
pH: 3.5 ii. Iodine Adsorption Test

A column having a diameter of 1 cm was filled with 5 $cm^3$ of each of the samples. Subsequently, each solution prepared in i was passed through the column at a flow rate at which the spatial velocity was 15 m/hr by a tube pump. The solution at an outlet side of the column was appropriately sampled, and the content of iodine in the solution was measured by ICP-MS.

By using a ratio $C/C_0$ of the concentration (C) of I in the solution at the outlet side of the column to the concentration ($C_0$) of I in the solution before liquid passage through the column, the ratio $C/C_0$ relative to a passage time was determined.

The evaluation results are shown in FIG. 2.

For the sample in which silver was supported on mordenite (Sample 9) and the sample in which silver was supported on chabazite (Sample 11), a $C/C_0$ of 0.03 or less was maintained for an extended period of time as compared with the sample in which silver was supported on the A-type zeolite (Sample 4) and the sample in which silver was supported on the X-type zeolite (Sample 5), and a long absorption life span for iodine was confirmed. For Sample 9 and Sample 11, the $C/C_0$ was increased 20 days or more after initiation of liquid passage, and a decrease in adsorption performance was recognized.

<Evaluation of Iodine Adsorption Properties and Evaluation of Differential Pressure using Samples 11 and 19> i. Preparation of Solution

Each of sodium iodide, L-ascorbic acid, and hydrochloric acid was prepared in artificial sea water (Marine art SF-1 available from Tomita Pharmaceutical Co., Ltd., was dissolved in ion exchanged water) at the following concentration.

Cl: 900 ppm by mass
I: 0.2 ppm by mass
L-ascorbic acid: 30 ppm by mass
pH: 3.5 ii. Evaluation of Iodine Adsorption Properties and Evaluation of Differential Pressure A column having a diameter of 1 cm was filled with 80 $cm^3$ of each of the samples. A pressure gauge was installed on an inlet side of the column. Subsequently, each solution prepared in i was passed through the column at a spatial velocity of 45 m/hr (flow rate of 2.83 L/h) by a tube pump. The pressure of the pressure gauge was appropriately read. The solution at an outlet side of the column was appropriately sampled, and the content of iodine in the solution was measured by ICP-MS.

The results of determined ratio $C/C_0$ of the concentration (C) of I in the solution at the outlet side of the column to the concentration ($C_0$) of I in the solution before liquid passage through the column are shown in FIG. 3.

A difference ($P-P_0$) between the pressure (P) during liquid passage and the pressure (Po) at initiation of liquid passage was determined as an increased differential pressure. The results are shown in FIG. 4.

For all Samples 11 and 19, an increase in $C/C_0$ was not recognized in the range of liquid passage period of 20 days, and a $C/C_0$ of 0.1 or less was maintained, as shown in FIG. 3. It was confirmed that Samples 11 and 19 had excellent iodine adsorption performance.

For Sample 11 in which Heat treatment before supporting silver was "absence" (the sample in which a zeolite before supporting silver was not subjected to a heat treatment at 600° C. for 30 minutes), $C/C_0$ was increased 20 days or more after initiation of liquid passage, and a decrease in adsorption performance was recognized. For Sample 19 in which Heat treatment before supporting silver was "presence" (the sample in which a zeolite before supporting silver was subjected to a heat treatment at 600° ° C. for 30 minutes), an increase in $C/C_0$ was not recognized even in the range of liquid passage period of 60 days, and no decrease in iodine adsorption performance was confirmed.

When the solution was passed through Sample 11 in which Heat treatment before supporting silver was "absence" under a differential pressure evaluation condition (2.83 L/h), a gradual increase in differential pressure was confirmed 10 days after initiation of liquid passage, and a further increase in differential pressure was confirmed 40 days after the initiation. For Sample 19 in which Heat treatment before supporting silver was "presence", an increase in differential pressure was not recognized even 60 days after initiation of liquid passage. It was confirmed that Sample 19 could withstand long-term use under an acidic condition where the reductant is added.

For Sample 19 that was Example of the present invention, brittleness such as a hole, a crack, and powdering did not occur in use under an acidic condition where the reductant was added, and it was confirmed that the differential pressure was unlikely to be increased during liquid passage and the number of days when liquid passage was possible was large as compared with Sample 11 that was Comparative Example. This is considered due to an influence in which brittleness of the adsorbent and excess precipitation of AgI that cause clogging during liquid passage are suppressed in Sample 19 that is Example of the present invention.

INDUSTRIAL APPLICABILITY

The radioactive iodine adsorbent of the present invention allows iodine ions to be adsorbed stably from a waste solution that becomes an acidic solution by addition of a reductant. In a treatment of radioactive waste liquid in which iodate ions and iodine ions coexist, the radioactive iodine adsorbent can be suitably used for application in which iodate ions are reduced to iodine ions by addition of the reductant to an aqueous solution containing radioactive iodine and the iodine ions are collectively removed.

The invention claimed is:

1. A method for processing radioactive iodine comprising a step of adding a reductant to a waste liquid drained from a nuclear facility to convert the waste liquid into an acidic solution, and a step of passing the acidic solution through a radioactive iodine adsorbent obtained by supporting silver on a high-silica zeolite in which a hydroxyl nest present inside the high-silica zeolite is converted into a Si—O—Si bond, wherein the high-silica zeolite is at least any selected from the group consisting of a chabazite (CHA)-type zeolite, a mordenite (MOR)-type zeolite, and a clinoptilolite (CLP)-type zeolite.

2. The method for processing radioactive iodine according to claim 1, wherein a $SiO_2/Al_2O_3$ molar ratio of the high-silica zeolite is more than 2 and 100 or less.

3. The method for processing radioactive iodine according to claim 1, wherein an amount of the supported silver is 1 to 15 mass %.

* * * * *